6 Sheets—Sheet 1.

H. C. ELLIOT.
Manufacture of Clothing.

No. 223,121.    Patented Dec. 30, 1879.

WITNESSES:
Jas. E. Hutchinson
Henry C. Hazard

INVENTOR.
H. C. Elliot, by
Prindle and his Attys

6 Sheets—Sheet 3.

H. C. ELLIOT.
Manufacture of Clothing.

No. 223,121.  Patented Dec. 30, 1879.

WITNESSES:
Jas. E. Hutchinson.
Henry C. Hazard.

INVENTOR.
H. C. Elliot, by
Prindle & Co his Atty

6 Sheets—Sheet 4.

H. C. ELLIOT.
Manufacture of Clothing.

No. 223,121. Patented Dec. 30, 1879.

WITNESSES:
Jas. E. Hutchinson.
Henry C. Hazard.

INVENTOR.
H. C. Elliot, by
Prindle and Russ his Attys

6 Sheets—Sheet 5

H. C. ELLIOT.
Manufacture of Clothing.

No. 223,121. Patented Dec. 30, 1879.

WITNESSES:
Jas. E. Hutchinson.
Henry C. Hazard.

INVENTOR.
H. C. Elliot, by
Prindle & Co. his Attys

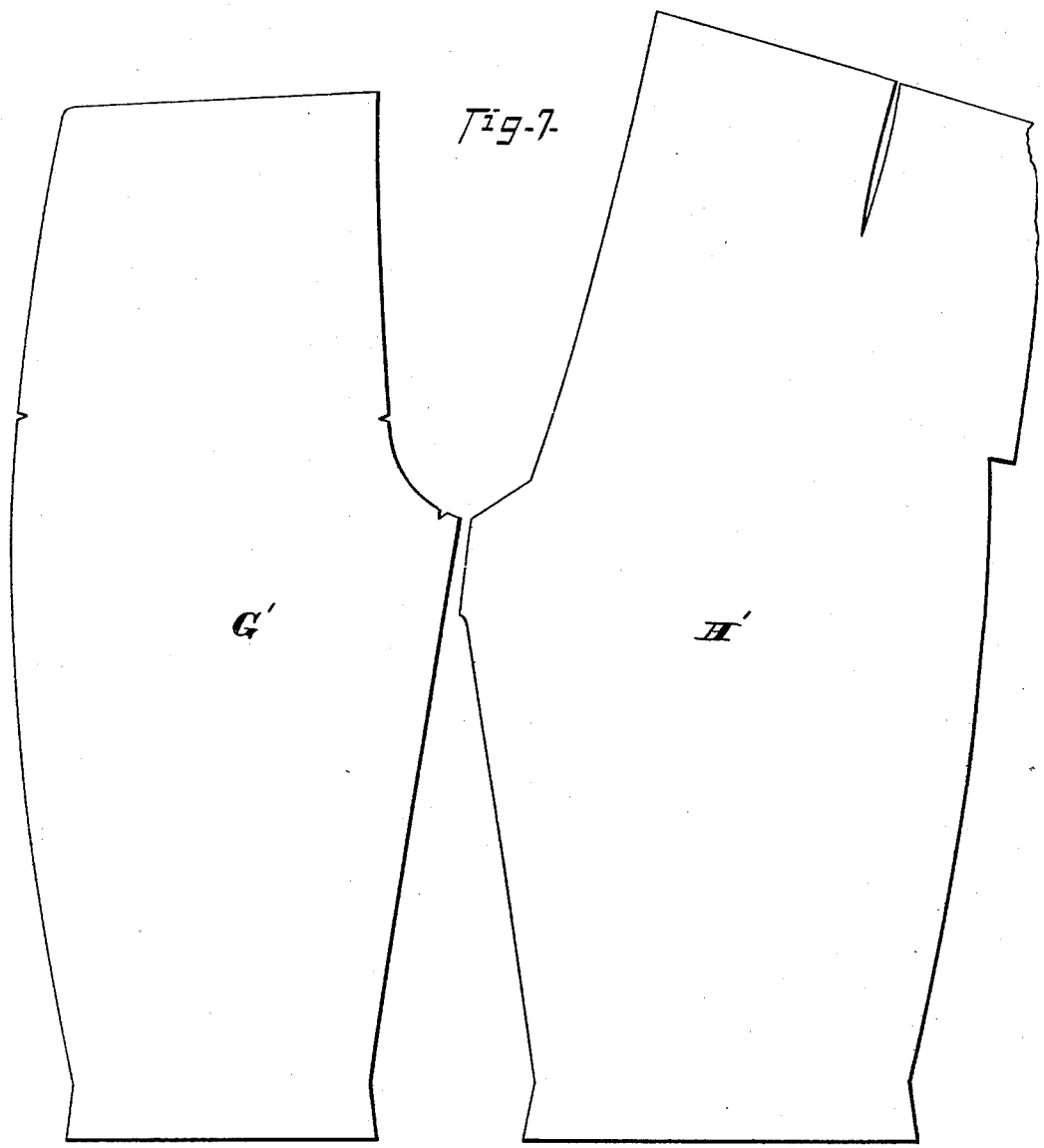

UNITED STATES PATENT OFFICE.

HENRY C. ELLIOT, OF NEW YORK, N. Y.

IMPROVEMENT IN THE MANUFACTURE OF CLOTHING.

Specification forming part of Letters Patent No. 223,121, dated December 30, 1879; application filed May 20, 1879.

*To all whom it may concern:*

Be it known that I, HENRY C. ELLIOT, of New York city, in the county and State of New York, have invented a certain new and useful Improvement in the Manufacture of Children's Clothing; and I do hereby declare that the following is a full, clear, and exact description thereof, reference being had to the accompanying drawings, making a part of this specification, in which—

Figure 1:
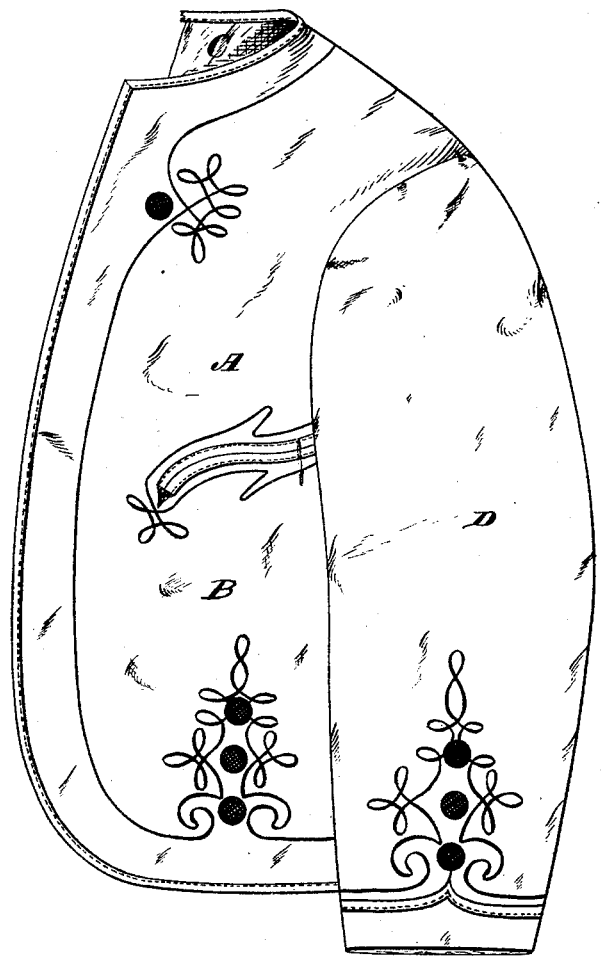
Figure 2:
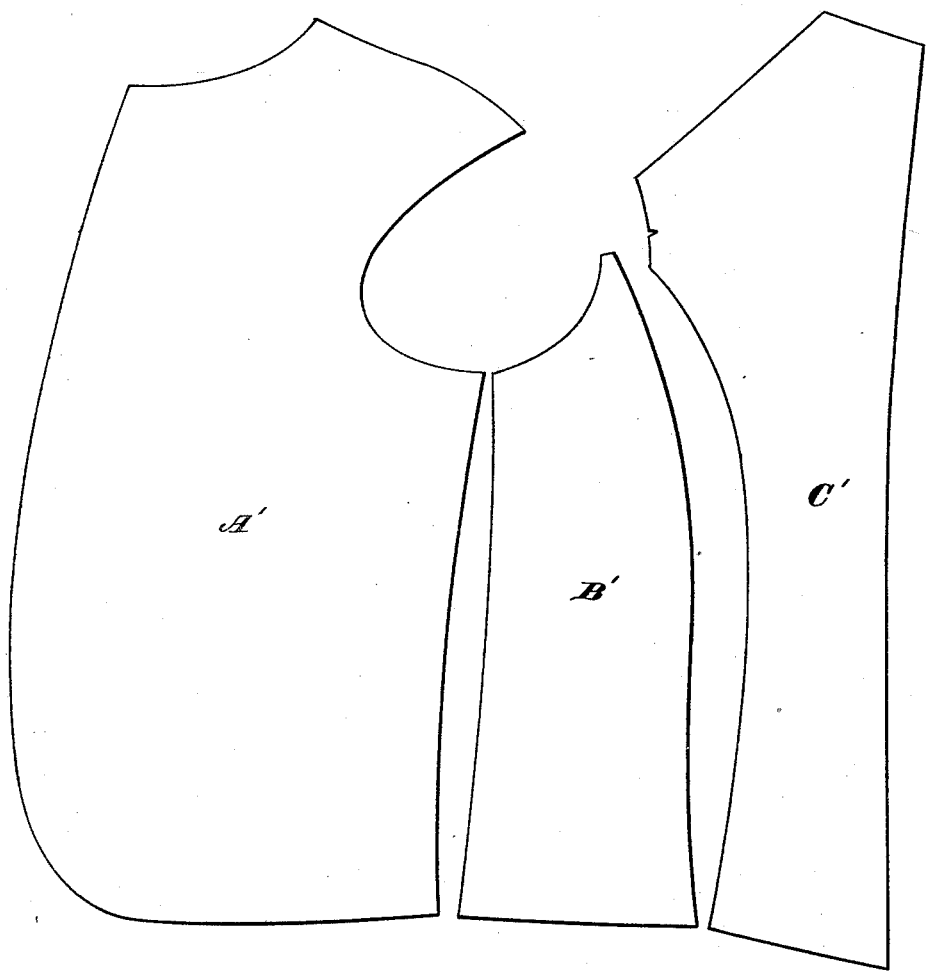
Figure 3:
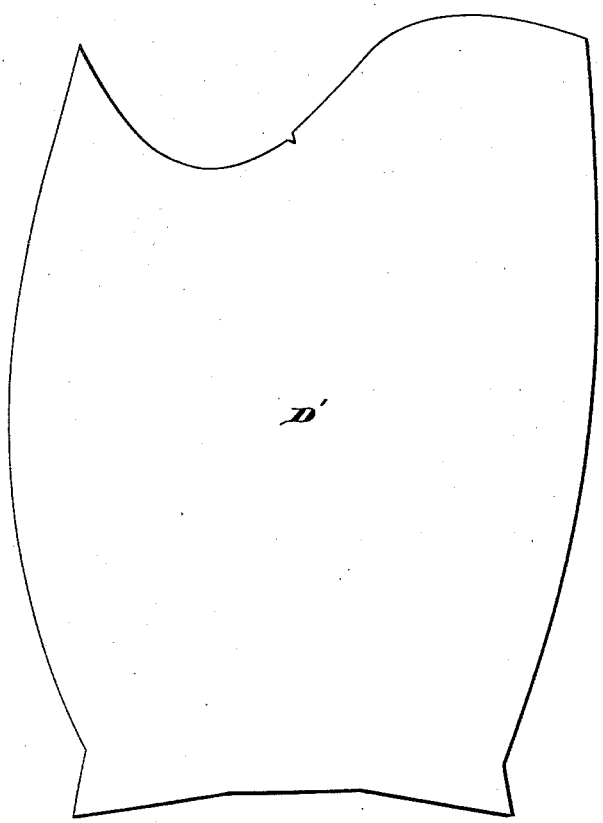
Figure 4:
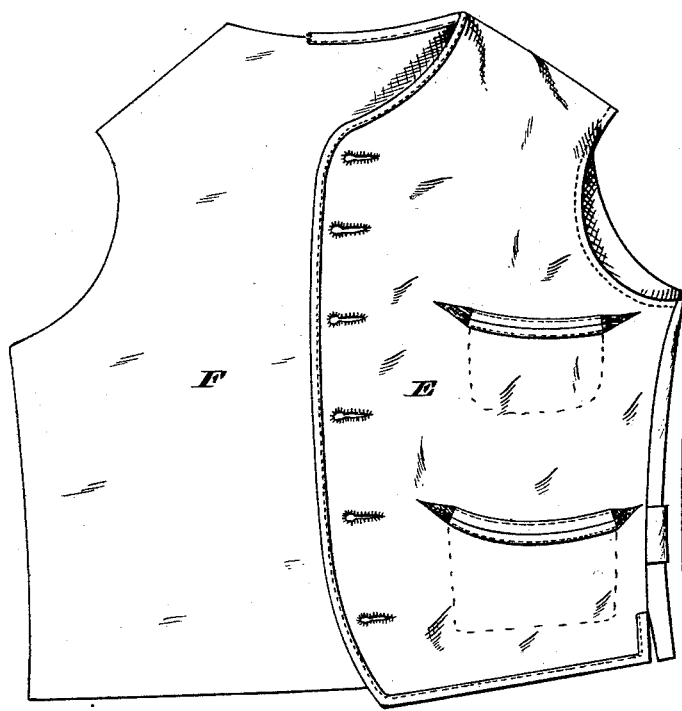
Figure 5:
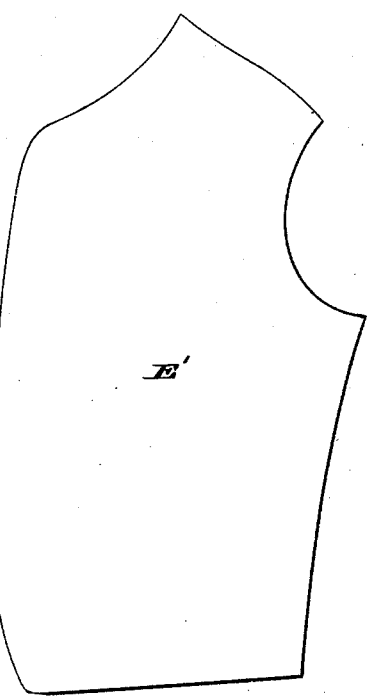
Figure 6:
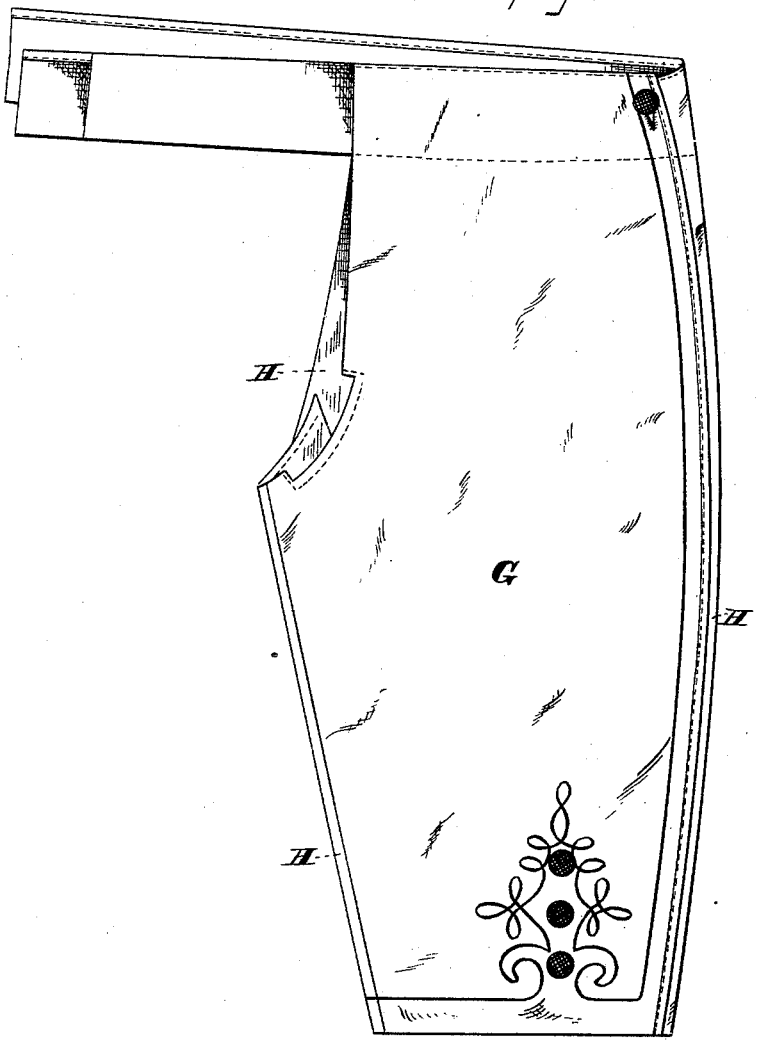

Figure 1 is a side elevation of the completed portion of a boy's jacket. Figs. 2 and 3 are plan views of the front, side, and back of the same incomplete. Fig. 4 is a side elevation of the completed portions of a boy's vest. Fig. 5 is a plan view of the remaining incomplete portion of the same. Fig. 6 is a side elevation of the completed portion of a child's pants, and Fig. 7 is a plan view of the incomplete portions of the same.

Letters of like name and kind refer to like parts in each of the figures.

The object of my invention is to enable the wearing-apparel of children to be manufactured at a less cost than has heretofore been practicable, and to enable those of moderate means to provide their children with garments which are artistically fitted and constructed at as low or lower expense than is now necessary for rudely-constructed and ill-fitting clothing; to which end it consists, principally, as an improvement in the method of manufacturing children's clothing, in the cutting out, fitting, connecting together, and finishing, by means of skilled labor, one each of such of the component parts of a jacket or other garment of a suit as are essentially duplicated in the completed article, and cutting, fitting, and otherwise preparing the remaining parts for connection, by unskilled labor, with each other and with the already-finished half of the garment, substantially as hereinafter specified.

It consists, further, as a new article of manufacture, in an incomplete jacket or other garment composed of separately-formed component parts, which are, in the main, duplicates, cut, fitted, and adapted for connection, and one of each of the same finished and connected to form half of the garment for guides, whereby the other cut and fitted parts, forming the remainder of the garment, may be finished and connected and the whole completed by unskilled labor, substantially as and for the purpose hereinafter shown.

My invention is designed to include all kinds of outer garments for children, so that it is only necessary to illustrate its application by means of one or more articles. For convenience I have selected a boy's suit of clothing.

In the annexed drawings, Fig. 1 shows a partially-completed jacket, in which one front, A, side B, back C, and sleeve D are constructed and combined in the usual manner, and any desired ornamention is affixed, the whole serving as a pattern or sample of the construction and finish of the other part of the garment. The remaining parts, (shown in Figs. 2 and 3,) consisting of the front A', side B', back C', and sleeve D', are cut to shape and suitably marked, so that any person capable of doing the plainest kind of sewing can connect them together and to the completed portion of the garment without difficulty.

In Figs. 4 and 5 are shown a child's vest, in which one of the front pieces, E, and one-half or the whole of the back F is completed and trimmed, while the remaining front piece, E', is fitted, but not completed or attached. In Figs. 6 and 7 are shown the pants, which complete the suit, one leg being completed by joining together and trimming the front piece, G, and back piece, H, while the front piece, G', and the back piece, H', of the other leg are cut and fitted, but not connected.

I propose to furnish my invention to the trade in the form of packages containing certain assorted sizes of each kind of outer garment worn by children, in which each part is accurately cut and fitted by skillful operatives, and one of each of the duplicated parts finished and trimmed, so as to furnish a guide for those who may complete the garment; and I propose, further, to furnish each of such packages so containing the partly-finished garment and remaining component parts with a photographic or other illustration of a finished garment of the same style, from which the operator who completes said garment may know just how it is intended to appear when finished.

Partly-finished garments, as described, may be completed at a trifling cost by such comparatively unskilled labor as is to be found in each household, by which means the cost of the finished article is much less than would be the case if all of the work were done by skilled, and consequently high-priced, labor.

I am aware that it is not new to construct incomplete shirts in which all of the component parts are cut and fitted, and the front, yoke, and neck-band united, said work being that portion requiring skilled labor, which shirts are manufactured under and mainly covered by the patent granted to J. H. Myers, February 13, 1872, No. 123,721, and reissued November 16, 1875, No. 6,749; and such I disclaim.

Having thus fully set forth the nature and merits of my invention, what I claim as new is—

1. The improved method of manufacturing children's clothing, consisting in the cutting out, fitting, connecting together, and finishing, by means of skilled labor, one each of such of the component parts of a jacket or other garment of a suit as are essentially duplicated in the completed article, and cutting, fitting, and otherwise preparing the remaining parts for connection, by unskilled labor, with each other and with the already-finished half of the garment, substantially as specified.

2. As a new article of manufacture, an incomplete jacket or other garment composed of separately-formed component parts, which are, in the main, duplicates, cut, fitted, and adapted for connection, and one of each of the same finished and connected to form half of the garment for guides, whereby the other cut and fitted parts, forming the remainder of the garment, may be finished and connected and the whole completed by unskilled labor, substantially as and for the purpose shown.

In testimony that I claim the foregoing I hereunto set my hand this 19th day of May, 1879.

HENRY C. ELLIOT.

Witnesses:
GEO. S. PRINDLE,
JAS. E. HUTCHINSON.